Nov. 3, 1931.   J. H. KOHLER   1,830,032
STAFF FOR ROTATING APPARATUS
Filed Jan. 8, 1924
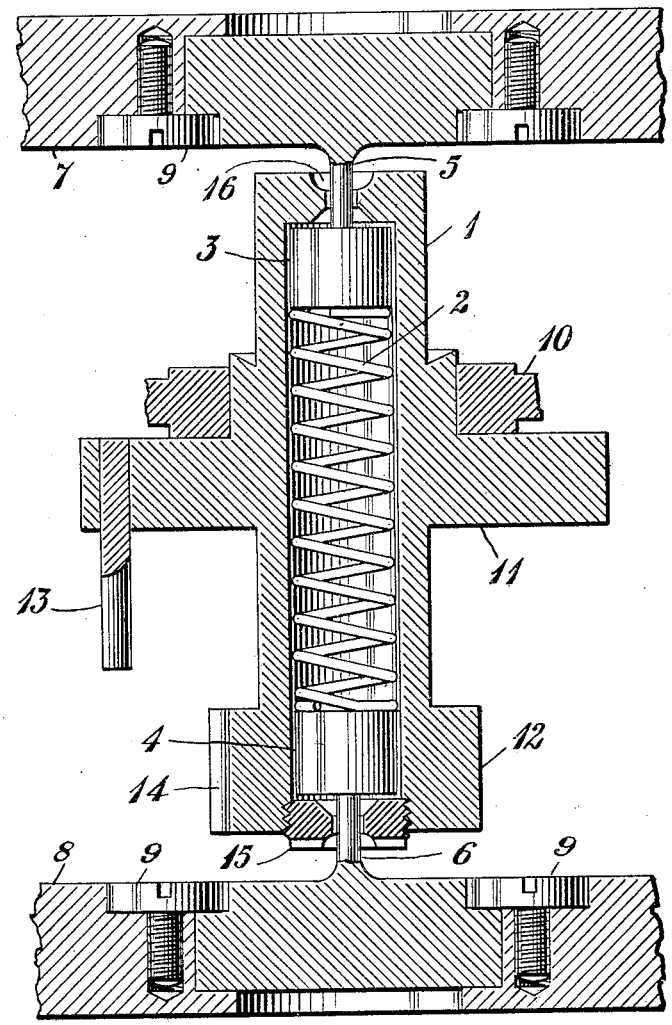
WITNESSES:
INVENTOR
John H. Kohler
BY
ATTORNEY

Patented Nov. 3, 1931

1,830,032

UNITED STATES PATENT OFFICE

JOHN H. KOHLER, OF PITTSBURGH, PENNSYLVANIA

STAFF FOR ROTATING APPARATUS

Application filed January 8, 1924. Serial No. 684,964.

My invention relates to staffs for rotating apparatus and particularly to balance staffs for horological devices.

One object of my invention is to provide a staff that shall have means for absorbing the shocks that are imposed thereon.

Another object of my invention is to provide a hollow balance staff for a time-keeping device.

Another object of my invention is to provide a balance staff, of the above-indicated character, that shall be supported by separately mounted pivots.

A further object of my invention is to provide a balance staff, of the above-indicated character, that shall have a roller table and a guard roller integral therewith.

A still further object of my invention is to provide a staff, of the above-indicated character, that shall be easy to construct and reliable in its operation.

In the past, it has been customary to make the staffs of horological and other rotating devices solid and to provide them with pivots at each end thereof. These pivots are adapted to be supported by bearing pieces, either jewels or of other material. When a watch or other horological device having a balance staff of this character is dropped or receives a severe shock in any way, the pivots at the ends of the balance staff are frequently bent or broken, because of their necessarily delicate construction.

In practicing my invention, I provide a hollow staff that contains a shock-absorbing device and that is adapted to be supported by separately mounted pivots. Thus, the pivots are so protected against shocks that there is much less probability of their being bent or broken than in the old type of solid staff. Furthermore, in the event that either or both of the pivots should be damaged when the device is used for a balance staff, the pivots may be easily replaced without removing the balance wheel from the staff, whereas in the old construction a new staff must be fitted to the balance wheel when the pivots on the old staff are damaged. The process of removing a balance wheel from its staff and fitting another staff to it is a delicate one and involves grave risk of injury to the wheel. As I have already stated, my invention makes it possible to replace the pivots of the balance staff without removing the balance wheel from the staff and, consequently, eliminates the possibility of damaging the wheel.

The single figure of the accompanying drawing is a sectional elevation through the center of a balance staff embodying my invention and of its separately mounted pivots and mountings.

Referring to the drawing, a hollow balance staff 1 contains a shock-absorbing spring 2 and a pair of bearing pieces 3 and 4. It will be understood that these bearing pieces may be either jewels or of other material and they will hereinafter be referred to as jewels. The staff 1 is supported through the jewels 3 and 4 by separate pivots 5 and 6 that are attached by screws 9 to a balance bridge 7 and a lower plate 8, respectively, of the watch mechanism.

A balance wheel 10 (shown in part only) is mounted on the staff 1 in the usual manner. A roller table 11 is provided on the staff 1, but instead of being fitted tightly to the staff in the usual manner, it is made as an integral part of the staff 1. In like manner, a guard roller 12 is also made as an integral part of the staff 1. The roller table 11 is provided with a roller jewel or pin jewel 13 that is adapted to be engaged by the escapement mechanism of the watch. The guard roller 12 has a semicylindrical slot 14 therein to provide clearance for a guard pin (not shown).

The lower side of the guard roller 12 is provided with an opening that is adapted to receive a hollow screw 15. This screw when in its proper position in the guard roller 12 serves to hold the jewels 3 and 4 and the spring 2 in position within the staff 1. The opening in the screw 15 permits the pivot 6 to extend therethrough to engage the jewel 4. In like manner, the pivot 5 extends through the opening 16 in the upper end of the staff 1 to engage the jewel 3.

When a watch that is provided with a balance staff comprising my invention is dropped or receives a severe shock in any way, the staff 1 is permitted to move longitudinally with respect to the pivots 5 and 6 because of the resiliency of the spring 2. The probability of the pivots 5 and 6 being damaged is, therefore, much less than in a watch provided with the ordinary type of balance staff.

In the event that either or both of the pivots 5 and 6 are damaged, however, they may be easily replaced without removing the balance wheel 10 from the staff 1 as is necessary in the ordinary type of watch. All that it is necessary to do is to remove the balance bridge 7 from the watch mechanism and lift the balance staff 1 together with the balance wheel 10 out of its position. The pivots 5 and 6 are then readily accessible and may be removed from their mountings by removing the screws 9. The damaged pivot or pivots may then be replaced with new ones and the watch mechanism reassembled without changing the mounting of the balance wheel 10 on the staff 1 in any way.

In the event that the jewels 3 and 4 or the spring 2 are damaged, the balance staff 1 and the balance wheel 10 may be taken out of the watch mechanism in the same manner as described above. The hollow screw 15 may then be taken out of the guard roller 12 to permit the jewels 3 and 4 and the spring 2 to be removed from the staff 1. Any of these parts that are damaged may then be replaced, the screw 15 returned to its proper position and the watch mechanism assembled as described above. The watch is now again in condition for use.

While I have shown my invention applied to the balance staff of a watch, I contemplate its use in any rotating device in which jewel or other similar bearings are necessary, such as in measuring instruments, small motors and the like.

I do not limit my invention to the specific construction shown in the drawing and described in the foregoing specification, as many changes may be made therein without departing from the spirit and scope of my invention, as set forth in the appended claim.

I claim as my invention:—

In combination, a balance staff having a longitudinal cylindrical bore therein and comprising a portion partly closing said bore at one end of the staff but having a bore of smaller diameter therethrough, a pair of substantially cylindrical bearing members co-axially and slidably disposed within the first-mentioned bore of said balance staff, a coiled compression spring also disposed within said first-mentioned bore and coacting between said bearing members to bias the same apart and toward the respective ends of the staff, a member partly closing the other end of said first-mentioned bore but likewise having a bore of smaller diameter therethrough, and a pair of fixed supporting members mounted externally of said staff and each having a pivot portion projecting inwardly through one of said bores of smaller diameter at the ends of the staff and engaging the corresponding bearing member to support the staff for rotation.

In testimony whereof I have hereunto subscribed my name this 5th day of January, 1924.

JOHN H. KOHLER.